US005673188A

United States Patent [19]
Lusher et al.

[11] Patent Number: 5,673,188
[45] Date of Patent: Sep. 30, 1997

[54] ZERO VOLTAGE SWITCHING SERIES RESONANT HALF BRIDGE VHF INVERTER

[75] Inventors: David M. Lusher; Wilbur E. Hong, both of Torrance; William B. Hwang, Los Angeles, all of Calif.

[73] Assignee: Hughes Electronic, Los Angeles, Calif.

[21] Appl. No.: 622,511

[22] Filed: Mar. 25, 1996

[51] Int. Cl.$^6$ ............................................. H02H 7/122
[52] U.S. Cl. ........................... 363/132; 363/17; 363/56
[58] Field of Search ........................ 363/16, 17.4, 41, 363/58, 95, 56, 97, 98, 132, 131, 135, 136

[56] References Cited

U.S. PATENT DOCUMENTS

| | | | |
|---|---|---|---|
| 4,594,650 | 6/1986 | Kinbara | 363/58 |
| 4,745,537 | 5/1988 | Cheung | 363/37 |
| 4,876,635 | 10/1989 | Park et al. | 363/17 |
| 4,947,309 | 8/1990 | Jonsson | 363/17 |
| 5,132,889 | 7/1992 | Hitchock et al. | 363/17 |
| 5,274,541 | 12/1993 | Kimura et al. | 363/56 |
| 5,325,283 | 6/1994 | Farrington et al. | 363/21 |
| 5,408,403 | 4/1995 | Nerone et al. | 363/37 |
| 5,422,765 | 6/1995 | Kobayashi et al. | 363/40 |
| 5,519,306 | 5/1996 | Itoh et al. | 323/222 |

*Primary Examiner*—Adolf Berhane
*Attorney, Agent, or Firm*—Leonard A. Alkov; Wanda K. Denson-Low

[57] ABSTRACT

A DC to AC inverter that includes a first capacitor (11) and a first inductor (13) connected in series between a positive voltage supply node and a central node; a first active switch switching (15) connected across the first capacitor and driven with a first periodic drive signal of a predetermined frequency; a second capacitor (21) and a second inductor (23) connected in series between a negative voltage supply node and the central node; a second active switch (25) connected across the second capacitor and being driven with a second periodic signal of said predetermined frequency and being out of phase by 180 degrees relative to the first periodic drive signal; a bandpass filter (31, 33) connected between the central node and an output node; and a load (47) connected between the output node and ground.

11 Claims, 1 Drawing Sheet

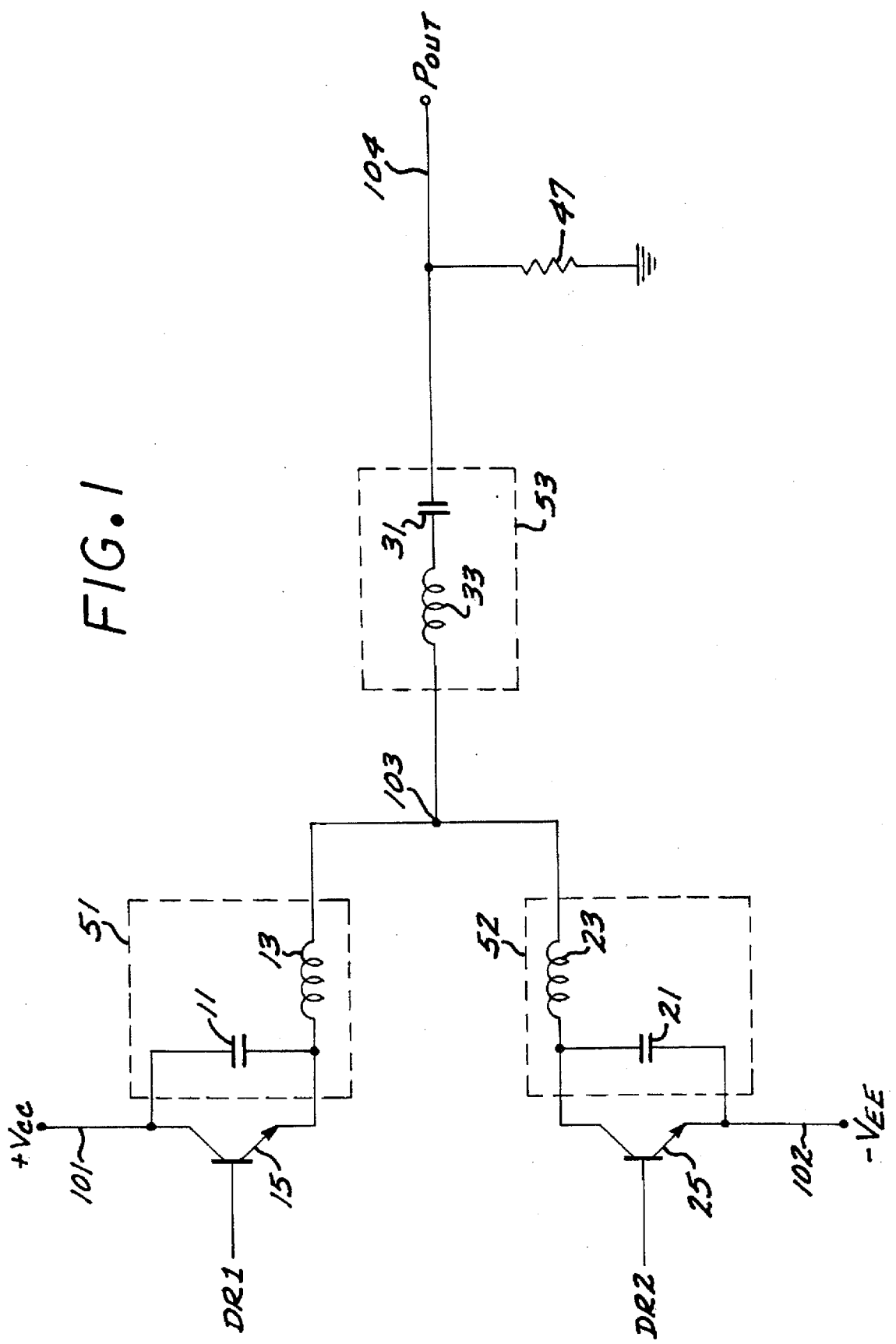

5,673,188

ZERO VOLTAGE SWITCHING SERIES RESONANT HALF BRIDGE VHF INVERTER

BACKGROUND OF THE INVENTION

The disclosed invention is generally directed to DC to AC inverters, and more particularly to a half bridge inverter having first and second switches each respectively configured independently in a zero-voltage switching mode.

DC to AC inverters are commonly employed in applications which require the conversion of DC power to AC power, including for example power supplies. DC to AC inverters have been designed to operate in the VHF range of frequencies since higher frequencies allow for significantly smaller passive components and also provide for faster feedback response to load perturbations.

Known VHF DC to AC inverters include single switch inverters and dual switch inverters which operate in a zero voltage switching mode wherein a resonant circuit is utilized to control the voltage across a switch such that the voltage across the switch is zero when it turns on and the parasitic capacitance of the switch is discharged by the resonant circuit.

A consideration with single switch inverters include stress due to large peak voltages when the switch is off, the need for a large inductor in the resonant circuit across the switch, and limitations on the input voltages.

While dual switch inverters address some of the problems associated with single switch inverters, a consideration with known dual switch inverters is the use of a resonant network that typically reduces to an equivalent parallel tank circuit. The duty cycle of each switch must be less than 50 percent to avoid shorting the supply voltage nodes, and thus the resonant frequency of the resonant network must be higher than the operating frequency of the inverter. The requirement for a duty cycle of less that 50 percent demands a quasi-squarewave which is difficult to generate in the VHF range. Moreover, a high resonant frequency requires a very small parallel capacitance, which places severe constraints on the transistors utilized as switches since the parasitic collector-emitter capacitances of the transistors form part of the parallel capacitance of the parallel tank circuit. In practice, it is very difficult to find a transistor device having both a small enough collector-emitter capacitance and large enough current handling capability.

Other considerations with known dual switch inverters include high conduction losses for push-pull topologies, and high switching losses for Class D topologies.

SUMMARY OF THE INVENTION

It would therefore be an advantage to provide a dual switch DC to AC inverter having reduced losses and which is readily implemented with off the shelf components.

The foregoing and other advantages are provided by the invention in a DC to AC inverter that includes a first capacitor and a first inductor connected in series between a positive voltage supply node and a central node; a first active switch switching connected across the first capacitor and driven with a first periodic drive signal of a predetermined frequency; a second capacitor and a second inductor connected in series between a negative voltage supply node and the central node; a second active switch connected across the second capacitor and being driven with a second periodic signal of said predetermined frequency and being out of phase by 180 degrees relative to the first periodic drive signal; and a bandpass filter connected between the central node and an output node.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic circuit diagram of a DC to AC inverter in accordance with the invention.

DETAILED DESCRIPTION OF THE DISCLOSURE

In the following detailed description and in the several figures of the drawing, like elements are identified with like reference numerals.

Referring now to FIG. 1, set forth therein is a schematic diagram of a DC to AC inverter in accordance with the invention which includes a first capacitor 11 having one terminal connected to a first supply node 101 which is connected to a supply voltage $V_{CC}$ that is positive relative to a ground reference. The other terminal of the first capacitor 11 is connected to one terminal of a first inductor 13 which has its other terminal connected to a central node 103. The collector terminal of a first NPN transistor 15 is connected to the first supply node 101, while the emitter of the first NPN transistor 15 is connected to the node between the first capacitor 11 and the first inductor 13. The base of the first NPN transistor 15 is driven with a first periodic drive voltage signal DR1 which has a predetermined frequency.

The first NPN transistor 15 comprises an active switch that provides an open circuit when it is open or non-conductive, and electrically connects the two terminals of the first capacitor 11 when it is conductive. The first capacitor 11 and the first inductor 13 comprise a first resonant circuit 51 that is configured to have a close to zero voltage across the first capacitor 11 when the NPN transistor 15 turns on.

The DC to AC inverter of FIG. 1 further includes a second capacitor 21 having one terminal connected to a second supply node 102 which is connected to a supply voltage $-V_{EE}$ that is negative relative to the ground reference. The other terminal of the second capacitor 21 is connected to one terminal of a second inductor 23 which has its other terminal connected to the central node 103. The collector terminal of a second NPN transistor 25 is connected to the node between the second capacitor 21 and the second inductor 23, while the emitter of the second NPN transistor 25 is connected to the second supply node 102. The base of the second NPN transistor 25 is driven with a second periodic drive voltage signal DR2 which is of the same predetermined frequency as the first periodic drive voltage signal DR1, but is 180 degrees out of phase with respect to the first periodic drive voltage signal DR1.

The second NPN transistor 25 comprises an active switch that provides an open circuit when it is open or non-conductive, and electrically connects the two terminals of the second capacitor 21 when it is conductive. The second capacitor 21 and the second inductor 23 comprise a second resonant circuit 52 that is particularly configured to have a close to zero voltage across the second capacitor 21 when the second NPN transistor 25 turns on.

More particularly as to the drive signals DR1, DR2, the first and second inductors 13, 23 in the first and second resonant circuits 51, 52 prevent rapid buildup of current, which allows the transistors 15, 25 to be advantageously driven with a 50 percent duty cycle. Thus, the first and second periodic drive voltage signals DR1, DR2 can comprise sinusoids which are easily produced in the VHF range. By way of illustrative example, the frequency of the periodic drive voltage signals DR1, DR2 is in the range of 30 MHz to 200 MHz. Since the transistors 15, 25 can be driven with a 50 percent duty, the first and second resonant circuits can be tuned, for example, to be in the range of 0.75 $F_0$ to 1.1 $F_0$, wherein $F_0$ is the frequency of the periodic drive voltage signals DR1, DR2 and thus the operating frequency of the inverter of FIG. 1. Since the resonant frequency of the first and second resonant circuits is close to the frequency of the periodic drive voltage signals DR1, DR2, the collector-emitter capacitances of the first and second NPN transistors 15, 25 are readily utilized with external capacitances to form the first and second capacitors 11, 21 of the resonant circuits.

A third inductor 33 and a third capacitor 31 are serially connected between the central node 103 and an output node 104. A load resistor 47 is connected between the output node 104 and the ground reference potential. The third inductor 33 and the third capacitor 31 form a bandpass filter 53 that is tuned to the frequency of the periodic drive voltage signals DR1, DR2, and the AC output $P_{out}$ of the DC to AC inverter of FIG. 1 is provided at the output node 104.

In operation, the first and second NPN transistors 15, 25 alternating turn on and off, the first resonant circuit 51 comprised of the first capacitor 11 and the first inductor 13 resonates such that the voltage across the first capacitor 11 rings to close to zero when the first NPN transistor turns on; and the second resonant circuit 51 comprised of the second capacitor 21 and the second inductor 23 resonates such that the voltage across the second capacitor 21 rings close to zero when the second NPN transistor 25 turns on. Thus, when first periodic drive voltage signal DR1 makes a positive zero crossing and the second periodic drive voltage signal makes a negative zero crossing, the first NPN transistor 15 turns on and the second NPN transistor turns off. The voltage at the collector of the second NPN transistor 25 increases from $-V_{EE}$ to a maximum, and then decreases so as to reach $-V_{EE}$ as the second periodic drive voltage signal DR2 makes a positive zero crossing. Analogously, when the first periodic drive voltage signal DR1 makes a negative zero crossing and the second periodic drive voltage signal DR2 makes a positive zero crossing, the first NPN transistor 15 turns off and the second NPN transistor 25 turns on. The voltage at the emitter of the first NPN transistor 15 decreases from $V_{CC}$ to a minimum, and then increases so as to reach $V_{CC}$ as the first periodic drive voltage signal DR1 makes a positive zero crossing.

While the foregoing illustrative example includes NPN transistors 15, 25, it should be appreciated that the invention can be implemented with N-channel field-effect transistors.

For an illustrative drive frequency of 30 MHz, the following are illustrative values for the passive components of the DC to AC inverter of FIG. 1:
Capacitors 11, 21: 120 pF
Inductors 13, 23: 80 μH
Inductor 33: 180 μH
Capacitor 31: 220 pF
Resistor 47: 25 Ω

While the foregoing has been an illustrative implementation wherein the emitter of the second NPN transistor 25 is connected to a voltage that is negative with respect to ground, in general the emitter of the second NPN transistor 25 can be connected to a voltage that is less than the positive voltage $V_{CC}$, for example ground.

The foregoing has been a disclosure of a VHF dual switch DC to AC inverter that advantageously provides for reduced losses, is readily implemented with off the shelf components, and has uncomplicated drive requirements.

Although the foregoing has been a description and illustration of specific embodiments of the invention, various modifications and changes thereto can be made by persons skilled in the art without departing from the scope and spirit of the invention as defined by the following claims.

What is claimed is:

1. A DC to AC inverter comprising:

a first capacitor and a first inductor connected in series between a first supply voltage node and a central node, said first supply voltage node being at a positive voltage relative to ground;

first switching means connected across said first capacitor, said first switching means being driven with a first periodic drive signal of a predetermined frequency;

said first capacitor and said first inductor comprising a first resonant circuit that is configured to have a close to zero voltage across the first capacitor when the first switching means is switched to a conductive state;

a second capacitor and a second inductor connected in series between a second supply voltage node and the central node, said second supply voltage node being at a voltage that is less than said positive voltage;

second switching means connected across said second capacitor, said second switching means being driven with a second periodic signal of said predetermined frequency and being out of phase by 180 degrees relative to said first periodic drive signal;

said second capacitor and said second inductor comprising a second resonant circuit that is configured to have a close to zero voltaqe across the second capacitor when the second switching means is switched to a conductive state; and wherein said first and second inductors prevent rapid buildup of current through said first and second switching means.

2. The DC to AC inverter of claim 1 wherein said second supply voltage node is at ground.

3. The DC to AC inverter of claim 1 wherein said second supply voltage node is at a negative voltage relative to ground.

4. The DC to AC inverter of claim 1 wherein said first switching means comprises a first NPN transistor, and said second switching means comprises a second NPN transistor.

5. The DC to AC inverter of claim 1 further comprising a bandpass filter connected between said central node and an output node.

6. The DC to AC inverter of claim 5 wherein said bandpass filter is tuned to said predetermined frequency.

7. The DC to AC inverter of claim 1 wherein said predetermined frequency is in the VHF frequency range.

8. The DC to AC inverter of claim 1 wherein said predetermined frequency is in the range of 30 MHz to 200 MHz.

9. The DC to AC inverter of claim 1 wherein said first resonant circuit and said second resonant circuit are each tuned to a resonant frequency in the range of 0.75 $F_O$ to 1.1 $F_O$, wherein $F_O$ is said predetermined frequency.

10. The DC to AC inverter of claim 1 wherein said first periodic drive signal is a first sinusoidal signal, and said second periodic drive signal is a second sinusoidal signal.

11. The DC to AC inverter of claim 10 wherein said first drive signal drives said first switching means at a 50% duty cycle, and said second drive signal drives said second switching means at a 50% duty cycle.

* * * * *